United States Patent Office
3,781,411
Patented Dec. 25, 1973

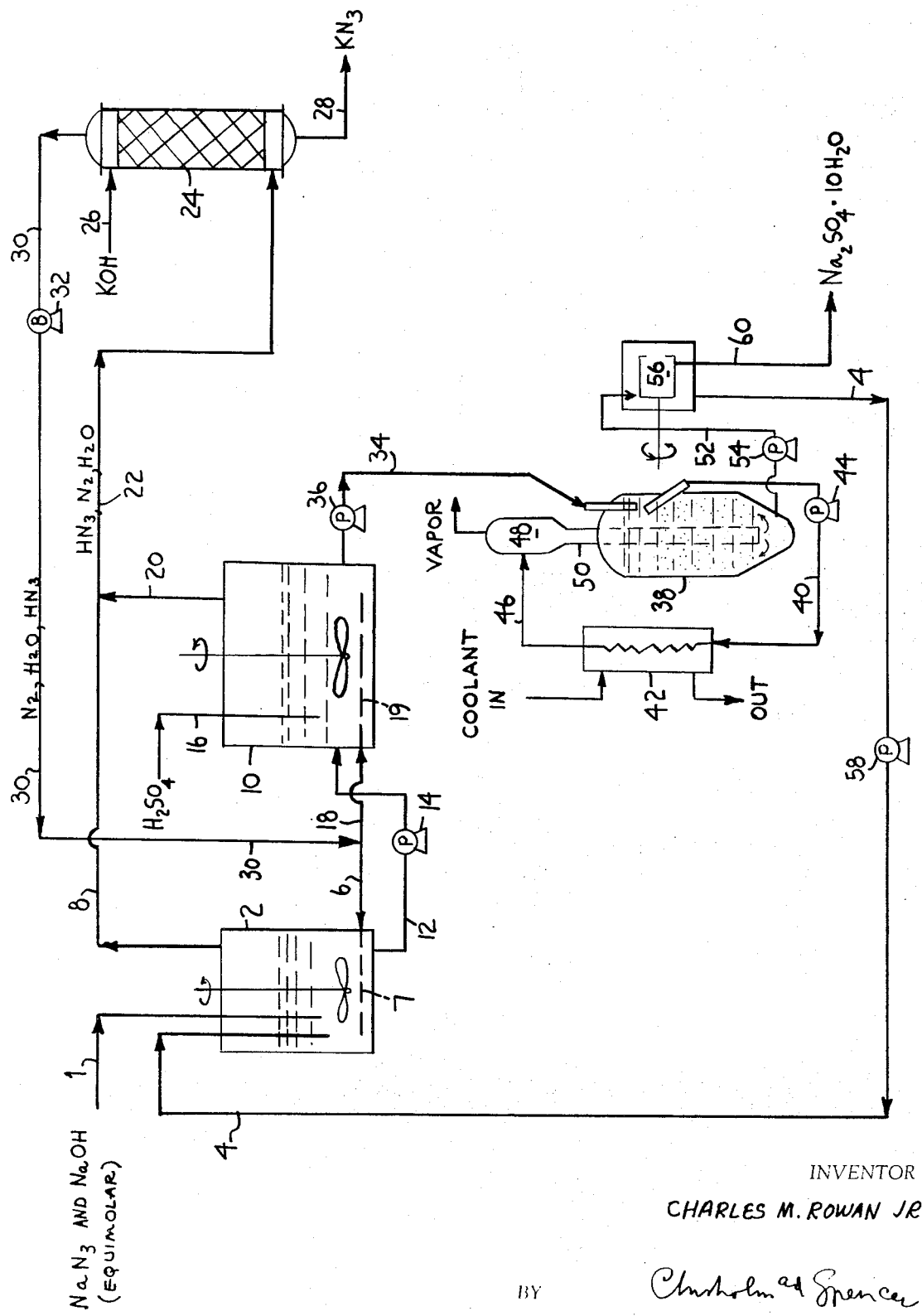

3,781,411
PROCESS FOR THE PRODUCTION OF
HYDRAZOIC ACID
Charles M. Rowan, Jr., Fort Lauderdale, Fla., assignor to
PPG Industries, Inc., Pittsburgh, Pa.
Filed Nov. 24, 1970, Ser. No. 92,373
Int. Cl. C01b 21/08
U.S. Cl. 423—406
23 Claims

ABSTRACT OF THE DISCLOSURE

The production of hydrazoic acid by acidifying an alkali metal azide or alkaline earth metal azide is described. The by-product salt of the acid concurrently produced is separated from the liquid, and the separated liquid is brought into contact with further quantities of the alkali metal azide or alkaline earth metal azide. Azide and acid values which would otherwise be lost in the by-product stream are retained.

---

Hydrazoic acid is becoming of increasing importance primarily as an intermediate in the preparation of various azide compounds such as its salts. Hydrazoic acid is bioactive and may be produced for those purposes. One particularly favorable use for hydrazoic acid is the preparation of alkali metal azide or alkaline earth metal azide by contacting the hydrazoic acid with the appropriate basic compound such as the hydroxide.

Hydrazoic acid may be prepared by several processes for which the basic chemistry is known. However, refinements must be made to the laboratory process employing the basic chemistry in order to achieve a commercially successful plant capable of producing sizable amounts of hydrazoic acid.

One of the known laboratory methods for producing hydrazoic acid is the acidification of at least one alkali metal azide or alkaline earth metal azide with an acid, such as one or more of the strong mineral acids. Such a process without further refinement is wasteful of both acid and azide values.

It is the purpose of this invention to achieve a more efficient utilization of acid and azide values in the production of hydrazoic acid by the acidification of at least one alkali metal azide or alkaline earth metal azide with a feed acid. This is accomplished by separating solid by-product salt of the feed acid from the bulk of a solution of the by-product salt to form a mother liquor and contacting further quantities of at least one alkali metal azide or alkaline earth metal azide with the mother liquor so formed. The azide treated with feed acid, hereinafter called the feed azide, is usually sodium azide.

Any of the acids which are stable and more acidic than hydrazoic acid may be used as the feed acid. The strong mineral acids are ordinarily used. Exemplary mineral acids are hydrochloric acid, sulfuric acid, nitric acid, and orthophosphoric acid. Other acids such as acetic acid are suitable. Of course, gases as hydrogen chloride, sulfur trioxide, or nitric oxide may be used if water is introduced elsewhere so as to form the acid in situ. Acidification may be by either a batch process or a continuous process.

The amount of feed acid employed may vary widely. If it is desired to convert only a portion of the feed azide to hydrazoic acid, the amount of feed acid used will be less than the stoichiometric amount. If substantially all of the feed azide is to be converted to hydrazoic acid, a stoichiometric amount or an excess of feed acid should be used. Of course, any basic impurities present in the feed azide should be accounted for in determining the amount of feed acid to use. Ordinarily enough acid is used to lower the pH of the reaction mixture to at least 6. A pH range of from about 1 to about 5 is typical. A range of about 2 to 4 is most often used. A pH of about 3 is preferred.

The reaction temperature may vary widely. The reaction is usually carried out at a temperature ranging from about 0° C. to about 100° C. A range of from about 40° C. to about 90° C. is typical. The preferred temperature range is from about 75° C. to about 80° C.

Atmospheric pressure is normally employed, although higher or lower pressures may be used.

The basic principles of the present invention are illustrated by reference to the figure. The illustrated process shows the formation of hydrazoic acid by acidifying sodium azide with hydrochloric acid. The hydrazoic acid so produced is contacted with potassium hydroxide to produce potassium azide, although the hydrazoic acid can be put to a number of other uses. Because sodium azide produced by the Wislicenus method produces one mole of sodium hydroxide for each mole of sodium azide produced, it is often convenient to acidify the mixture rather than eseparate the sodium hydroxide from the sodium azide before acidifying the sodium azide. If the sodium hydroxide is not removed, additional acid will be required to neutralize it when the sodium azide is acidified.

Referring in more detail to the figure, equimolar portions of sodium azide and sodium hydroxide are fed through line 1 to mix tank 2 where they are contacted with mother liquor containing acid and azide values which is introduced through line 4. Nitrogen, introduced through line 6 and sparger 7, is bubbled through the mixture to dilute any hydrazoic acid formed and sweep it from the mix tank through line 8. Because hydrazoic acid is explosive in concentrated amounts, dilution by an inert gas such as nitrogen, helium, argon, neon, xenon, krypton, air, methane, ethane, water vapor, $CF_4$, $CF_3Cl$, or mixtures thereof is desirable to reduce the possibility of an explosion. Liquid from mix tank 2 having a pH of about 5 to 6 is forwarded to mix tank 10 through line 12 by pump 14. Sulfuric acid is introduced through line 16 to lower the pH of the reaction mixture to about 2 to 3. Nitrogen is introduced through line 18 and sparger 19 to sweep hydrazoic acid from mix tank 10 through line 20. The hydrazoic acid streams in lines 8 and 20 are advantageously combined in line 22 although they may be utilized separately if desired. Hydrazoic acid, nitrogen, and some water vapor are passed through line 22 to scrubber 24 where they are contacted with aqueous potassium hydroxide introduced through line 26. The scrubber may be of any of many conventional designs such as, for example, bubble cap column, sieve tray column, packed column, spray column, disc and donut column, or liquid filled column. Flow may be either countercurrent or parallel. In the figure, a packed column utilizing countercurrent flow is shown. Potassium azide solution removed from scrubber 24 through line 28 may be used directly as an aqueous solution or it may be forwarded for further processes such as crystallization, drying, and packaging. Nitrogen, some water vapor, and a small amount of hydrazoic acid are removed from scrubber 24 through line 30 where they are forwarded by blower 32 to lines 6 and 18. It may be seen that nitrogen is recycled through mix tanks 2 and 10 and through scrubber 24 thereby containing most of the hydrazoic acid within the system. Make-up nitrogen may be added at any convenient location in the nitrogen system. Should there be any build-up of inert gases in the nitrogen system, the excess may be vented, preferably through a basic solution to neutralize any hydrazoic acid present. Liquid from mix tank 10 is forwarded through line 34 by pump 36 to cooling crystallizer 38. Mother liquor and the feed solution are circulated through line 40 and heat exchanger 42 by pump 44. Coolant is circulated through the heat exchanger to cool the circulating mother liquor and feed solution to about 15° C. The supersaturated mother liquor and feed solution is introduced to a bed of crystals through line 46, vapor heat 48, and leg 50. A vacuum may be applied to the vapor head if vapor is to be removed. Magma is withdrawn from the crystallizer through line 52 by pump 54. The magma is introduced to a centrifuge 56 where the bulk of the mother liquor is removed through line 4 and forwarded by pump 58 to mix tank 2. Sodium sulfate decahydrate (Glauber's salt) is removed from centrifuge 56 through line 60. Because the mother liquor contains azide and acid values, the present invention retains these values by recycling the mother liquor. Without the recycle, these values would be lost in the by-product stream. A water balance should be maintained throughout the system. If make-up water is to be added, it may conveniently be introduced with either or both of the feed materials. If there is a water accumulation, the excess may be removed from vapor head 48 or a small evaporator may be added to the system for this purpose. Alternatively, the cooling crystallizer may be replaced with an evaporator-crystallizer. Other modifications may be made such as substitution of a filter for the centrifuge. One or more mix tanks and one or more scrubbers may be used. If a plurality is used, it may be operated in series or in parallel or both in series and in parallel.

Although the detailed process for the production of hydrazoic acid which has been described has been incorporated into an over-all process for converting sodium azide into potassium azide using hydrazoic acid as an intermediate, it will be appreciated that flexibility is an outstanding advantage. By varying the identities of the feed azide and the base fed to the scrubber, a large number of azides may be converted to other azides. Thus, an alkali metal azide may be converted into another alkali metal azide as shown in detail herein, alkali metal azide may be converted to alkaline earth metal azide, alkaline earth metal azide may be converted to alkali metal azide, and alkaline earth metal azide may be converted to another alkaline earth metal azide. Even the same azide as the feed azide may be regenerated by scrubbing with the appropriate base.

Feed azides suitable for use in this invention include lithium azide, sodium azide, potassium azide, rubidium azide, cesium azide, beryllium azide, magnesium azide, calcium azide, strontium azide, and barium azide. Of the alkali metal azides, sodium azide and potassium azide are most often used. Sodium azide is preferred. Of the alkaline earth metal azides, magnesium azide, calcium azide, strontium azide, and barium azide are most often used. Magnesium azide and calcium azide are preferred. Of course, mixtures of azides are suitable for use.

The base selected for feeding to the scrubber may be any soluble hydroxide or salt of the alkali metals or alkaline earth metals which will react to form the azide. Exemplary salts are the soluble carbonates such as sodium carbonate or potassium carbonate. Even the slightly water-soluble compounds such as calcium carbonate or magnesium carbonate may be used. It is convenient to utilize a slurry of the slightly-soluble salts which react with hydrazoic acid in order to promote both mutual contact of the salt and hydrazoic acid and ease of handling. Examples of compounds suitable for feeding to the scrubber include lithium hydroxide, sodium hydroxide, potassium hydroxide, rubidium hydroxide, cesium hydroxide, magnesium hydroxide, calcium hydroxide, strontium hydroxide, barium hydroxide, dimethylberyllium (anhydrous solvent), diethylmagnesium (anhydrous solvent), magnesium carbonate, and calcium carbonate.

While the invention has been described with reference to certain illustrative embodiments, it is not intended that it shall be limited thereby except insofar as appears in the accompanying claims.

What is claimed is:

1. In the method of preparing hydrazoic acid from a feed azide selected from the group consisting of alkali metal azide and alkaline earth metal azide wherein said feed azide is contacted with an excess of a feed acid to generate hydrazoic acid and to form an acidic solution of by-product salt selected from the group consisting of alkali metal salt of said feed acid and alkaline earth metal salt of said feed acid, the improvement comprising:
    (a) separating solid by-product salt from the bulk of the acidic solution, thereby forming an acidic mother liquor, and
    (b) contacting further quantities of said feed azide with said acidic mother liquor.

2. The method of claim 1 wherein said by-product salt is crystallized from said acidic solution before said separation.

3. The method of claim 1 wherein said by-product salt is selected from the group consisting of alkali metal chloride, alkali metal sulfate, alkaline earth metal chloride and alkaline earth metal sulfate.

4. The method of claim 3 wherein said by-product salt is selected from the group consisting of sodium chloride and sodium sulfate.

5. The method of claim 1 wherein the feed acid is a strong mineral acid.

6. The method of claim 5 wherein said strong mineral acid is selected from the group consisting of hydrochloric acid and sulfuric acid.

7. The method of claim 1 wherein said feed azide is sodium azide.

8. In the method of preparing an azide selected from the group consisting of alkali metal azide and alkaline earth metal azide wherein a feed azide selected from the group consisting of alkali metal azide and alkaline earth metal azide is contacted with an excess of a feed acid to generate hydrazoic acid and form an acidic solution of by-product salt selected from the group consisting of alkali metal salt of said feed acid and alkaline earth metal salt of said feed acid and wherein generated hydrazoic acid is contacted with a basic compound of at least one alkali metal or alkaline earth metal, the improvement comprising:
    (a) separating solid by-product salt from the bulk of the acidic solution, thereby forming an acidic mother liquor, and
    (b) contacting further quantities of said feed azide with said acidic mother liquor.

9. The method of claim 8 wherein said by-product salt is crystallized before said separation.

10. The method of claim 8 wherein said by-product salt is selected from the group consisting of alkali metal chloride, alkali metal sulfate, alkaline earth metal chloride, and alkaline earth metal sulfate.

11. The method of claim 10 wherein said by-product salt is selected from the group consisting of sodium chloride and sodium sulfate.

12. The method of claim 8 wherein said feed acid is a strong mineral acid.

13. The method of claim 12 wherein said strong mineral acid is selected from the group consisting of hydrochloric acid and sulfuric acid.

14. The method of claim 8 wherein said feed azide is sodium azide.

15. In the method of preparing potassium azide from sodium azide wherein the sodium azide is contacted with an excess of a feed acid to generate hydrazoic acid and form an acidic solution of by-product sodium salt of said feed acid and wherein said hydrazoic acid is contacted with potassium hydroxide to produce potassium azide, the improvement comprising:
    (a) separating solid by-product sodium salt of said feed acid from the bulk of the acidic solution thereby forming an acidic mother liquor, and
    (b) contacting further quantities of sodium azide with said acidic mother liquor.

16. The method of claim 13 wherein said by-product sodium salt is selected from the group consisting of sodium chloride and sodium sulfate.

17. The method of claim 13 wherein said feed acid is a strong mineral acid.

18. The method of claim 15 wherein said strong mineral acid is selected from the group consisting of hydrochloric acid and sulfuric acid.

19. In the method of preparing potassium azide from sodium azide wherein the sodium azide is contacted with an excess of a feed acid to generate hydrazoic acid and form an acidic solution of by-product sodium salt of said feed acid and wherein said hydrazoic acid is contacted with potassium hydroxide to produce potassium azide, the improvement comprising:
 (a) crystallizing by-product sodium salt of said feed acid from said acidic solution to form a magma containing said crystallized by-product sodium salt and an acidic mother liquor.
 (b) separating said crystallized by-product sodium salt from the bulk of said acidic mother liquor, and
 (c) contacting further quantities of sodium azide with said acidic mother liquor.

20. The method of claim 19 wherein said feed acid is a strong mineral acid.

21. The method of claim 20 wherein said strong mineral acid is selected from the group consisting of hydrochloric acid and sulfuric acid.

22. The method of claim 19 wherein said by-product sodium salt is selected from the group consisting of sodium chloride and sodium sulfate.

23. The method of claim 22 wherein said by-product sodium salt is sodium sulfate decahydrate.

References Cited
UNITED STATES PATENTS 2,710,247   6/1955   Knowles et al. _____ 23—122 X

OTHER REFERENCES

Audreith et al.: Inorganic Synthesis, vol. 1, McGraw-Hill, New York, 1939, pp. 77–79.

Reitzner et al.: Picatinny Arsenal Technical Memorandum No. 1187, Dover, N.J., 1963.

Babor et al.: General College Chemistry, Thomas Y. Crowell.

GEORGE O. PETERS, Primary Examiner

U.S. Cl. X.R.
423—410